United States Patent
Ahnell

(10) Patent No.: US 11,269,358 B2
(45) Date of Patent: Mar. 8, 2022

(54) METHOD FOR CONTROLLING THE TRAVEL PATH OF AUTOMATED GUIDED VEHICLES

(71) Applicant: KOLLMORGEN AUTOMATION AB, Mölndal (SE)

(72) Inventor: Jan Ahnell, Lindome (SE)

(73) Assignee: KOLLMORGEN AUTOMATION AB, Mölndal (SE)

( * ) Notice: Subject to any disclaimer, the term of this patent is extended or adjusted under 35 U.S.C. 154(b) by 269 days.

(21) Appl. No.: 16/484,585

(22) PCT Filed: Feb. 16, 2018

(86) PCT No.: PCT/EP2018/053942
§ 371 (c)(1),
(2) Date: Aug. 8, 2019

(87) PCT Pub. No.: WO2018/149997
PCT Pub. Date: Aug. 23, 2018

(65) Prior Publication Data
US 2019/0361464 A1    Nov. 28, 2019

(30) Foreign Application Priority Data
Feb. 17, 2017    (EP) .................................... 17156608

(51) Int. Cl.
*G05D 1/02*    (2020.01)
*G05B 19/418*    (2006.01)
(Continued)

(52) U.S. Cl.
CPC ..... *G05D 1/0289* (2013.01); *G05B 19/41895* (2013.01); *G08G 1/22* (2013.01);
(Continued)

(58) Field of Classification Search
CPC ......... G05D 1/0289; G05D 2201/0216; G05D 1/0212; G05D 1/0293; G05B 19/41895;
(Continued)

(56) References Cited

U.S. PATENT DOCUMENTS

| 4,979,113 A | * | 12/1990 | Roberts | G05D 1/0282 |
| | | | | 180/168 |
| 2008/0186204 A1 | * | 8/2008 | Buckley | G01S 13/87 |
| | | | | 340/901 |

FOREIGN PATENT DOCUMENTS

| FR | 2789643 A1 * | 8/2000 | ........... G05D 1/0289 |
| FR | 2789643 A1 | 8/2000 | |

OTHER PUBLICATIONS

International Search Report (PCT/ISA/210) dated May 18, 2018, by the European Patent Office as the International Searching Authority for International Application No. PCT/EP2018/053942.

* cited by examiner

Primary Examiner — Khoi H Tran
Assistant Examiner — Nhi Q Bui
(74) Attorney, Agent, or Firm — Buchanan Ingersoll & Rooney P.C.

(57) ABSTRACT

A method and a system for controlling the travel path of automated guided vehicles in a system where at least one automated guided vehicle is in the form of a towing vehicle pulling at least a first wagon. A path for the towing vehicle to travel along is determined, as well as a first position of the towing vehicle. Data identifying the first position is stored in a data storage unit and a reserved state is assigned to a path portion based on the stored data. A second vehicle is prohibited from entering the path portion while in the reserved state, to prevent collision. The towing vehicle is moved from the first position, along the path, to a second (Continued)

position, and the reserved state of the path portion is cancelled once the first wagon has passed the path portion.

17 Claims, 7 Drawing Sheets

(51) Int. Cl.
*G08G 1/00* (2006.01)
*G08G 1/16* (2006.01)
(52) U.S. Cl.
CPC .............. *G05B 2219/50393* (2013.01); *G05D 2201/0216* (2013.01); *G08G 1/166* (2013.01)
(58) Field of Classification Search
CPC ........... G05B 2219/50393; G08G 1/22; G08G 1/166; B60W 30/00; G01C 21/32
See application file for complete search history.

METHOD FOR CONTROLLING THE TRAVEL PATH OF AUTOMATED GUIDED VEHICLES

FIELD OF THE INVENTION

The present invention relates to a method for controlling the travel path of automated guided vehicles. It particularly relates to automated guided vehicles pulling one or several wagons. The invention also relates to an automated guided vehicle system.

BACKGROUND OF THE INVENTION

Automated guided vehicles (AGV) are used in a number of application areas today, such as factories, warehouses and hospitals. Different AGV systems use different navigation methods and commonly used ones today are reflectors arranged on walls in combination with lasers, or magnets arranged in the floor.

In a system including several AGVs, a software system is normally used for setting up traffic rules to control the movements of the AGVs and allow them to move without colliding with each other. In these systems, the possible travel paths for the vehicles may be defined, and the paths are usually divided into portions of different lengths.

The AGVs may be described in the system with symbols based on their dimensions. When planning a travel route for an AGV, the system may calculate the area that the vehicle will pass when it travels along each of the portions of the defined travel path, i.e. the sweep area. The sweep areas are used for generating the traffic rules. This is done either by calculating what portions of the path need to be available for an AGV to move along a certain path, and allowing it to move if these portions are available, or by reserving path portions ahead of the vehicle to make sure they are available. The purpose of both ways of generating traffic rules are to avoid collisions.

These systems work well for single AGVs, i.e. AGVs that are not pulling any wagons, but in some applications it is desirable to have one or a plurality of wagons pulled by an AGV, i.e. a train. AGVs capable of pulling wagons may for example be referred to as towing vehicles, tuggers or tow tractors. Wagons may also be referred to as trailers, or carts. In these cases, the traffic rules need to be adjusted to avoid collision between an AGV and a wagon pulled by another AGV. One option could be to use a large static symbol covering both the AGV and the wagon(s) it is pulling. If the symbol has a rectangular shape, based on the maximum train length, it will work fairly well on straight path portions, but it will cause issues with curved path portions where unnecessary path portions will be reserved, and hence blocked from other AGVs to use, and path portions that should be reserved may not be so.

Using a large symbol having a triangular shape, based on the maximum train length and minimum curve radius, might be another option. This would enable reservation of every path portion that has to be reserved, but it would also cause a lot of unnecessary reservations and lead to very restricting traffic rules. These unnecessary reservations cost unnecessary amounts of time for the system, and they demand manual work for erasing the incorrect reservations.

Another solution would be to calculate all of the blocking rules for curved path portions manually, but this requires a lot of labour and causes restrictions in the traffic.

The reason for why trains are more difficult to create traffic rules for than single AGVs is the fact that the shape of the train is not fixed. When moving along curved portions of a path, the train will have a different shape than when moving along a straight portion. This causes issues when trying to create traffic rules for the whole train.

SUMMARY OF THE INVENTION

It is an object of the present invention to alleviate at least some of the mentioned drawbacks of the prior art and to provide an improved system for creating traffic rules in AGV systems where at least one AGV is in the form of a towing vehicle pulling at least one wagon. This and other objects, which will become apparent in the following, are accomplished by a method and a system as defined in the accompanying independent claims.

The present invention is based on the realisation that historical positions of a towing vehicle can be used to calculate the current position of a wagon being pulled by it. Using these positions, more accurate traffic rules can be created with less labour than when using the methods described in the background.

According to a first aspect of the present invention, a method is provided for controlling the travel path of automated guided vehicles in a system comprising at least a first and a second automated guided vehicle, wherein at least said first automated guided vehicle is in the form of a first towing vehicle, and wherein at least said first towing vehicle is pulling at least a first wagon. The method comprises determining at least a first path for said first towing vehicle to travel along, determining a first position of the first towing vehicle and storing data identifying said first position in a data storage unit. Based on said stored data and said determined first path, a reserved state is assigned to at least a first path portion of said first path, and said second automated guided vehicle is prohibited from entering said first path portion while in the reserved state, to prevent the second automated guided vehicle from colliding with said first wagon or said first towing vehicle. The method further comprises moving said first towing vehicle from said first position, along said first path, to a second position, and cancelling said reserved state of said first path portion once said first wagon has passed said first path portion.

The method according to the first aspect of the present invention is not restricted to said steps of said method being performed in said order. According to one exemplary embodiment of the described method, the step of moving said first towing vehicle from said first position is performed after said reserved state has been assigned to said first path portion. According to another embodiment, said step of moving said first towing vehicle from said first position is performed before said reserved state has been assigned, and according to yet another embodiment said step of moving said first towing vehicle from said first position is performed simultaneously with said step of assigning a reserved state to said first path portion.

The method according to another exemplary embodiment may further comprise checking if any path portion between said first position and said second position are assigned with a reserved state, before moving said first towing vehicle from said first to said second position. If any one of said path portions between said first and second position are in a reserved state, said first towing vehicle may be prohibited from moving to said second position until said reserved state of any one of said path portions has been cancelled. This is to avoid collision between said first towing vehicle and said second automated guided vehicle or any wagon being pulled by said second automated guided vehicle.

According to an exemplary embodiment of the first aspect of the present invention, said step of assigning a reserved state to said first path portion is performed when at least a part of said first wagon has not yet reached said first path portion.

According to another exemplary embodiment, said first towing vehicle is pulling multiple wagons, and said first wagon is the wagon out of the multiple wagons which is currently located most distally from said first towing vehicle. In one exemplary embodiment, wherein an additional wagon is connected distally to the first wagon, said additional wagon becomes a new first wagon.

In one exemplary embodiment, the width of said first path portion corresponds to the largest of the width of the first towing vehicle and the width of the first wagon or any other wagon being pulled by said first towing vehicle, plus an additional safety margin. Said safety margin is between 50-1000 mm, more preferably between 50-500 mm, and most preferred between 100-200 mm. It is preferred to use a larger safety margin when a large number of wagons are being pulled by said first towing vehicle, and to use a smaller safety margin when fewer wagons are being pulled. This is due to that when a large number of wagons are being pulled, the wagons that are located most distally from said first towing vehicle tend to deviate more from said first path in curved path portions than a small number of wagons do, hence a larger safety margin is needed. A large safety margin may for example also be used in embodiments where the wagon(s) pulled by the first towing vehicle are large containers or trucks. A smaller safety margin may for example be used in embodiments where the wagon(s) are pallet sized or substantially pallet sized. A pallet may for example be a standard European pallet, also called EUR-pallet, Europallet or EPAL-pallet, or a standard American pallet type. At the time of writing a standard European pallet has a dimension of 1200×800 mm, and a typical American pallet type has a dimension of 40×48 inches (1016×1219 mm).

According to one exemplary embodiment, the method may further comprise determining the total length along said first path of the first wagon and any other wagon being pulled by said first towing vehicle, and determining the position of said first wagon based on the stored data identifying positions of the first towing vehicle and said total length along said first path. Data identifying the position of said first wagon may then be stored, and updated when said towing vehicle moves to a new position. Performing named steps is one exemplary way of determining when said first wagon has passed said first path portion, so that cancelling of said reserved state of said first path portion can be performed.

According to another exemplary embodiment, the method may further comprise determining a distance along said first path respectively between a part of said first towing vehicle and a part of each wagon being pulled by said towing vehicle, and based on this distance along said first path together with said stored data identifying positions of said first towing vehicle, determining the respective position of each of said wagons. Data identifying the respective positions of each of said wagons may then be stored in said data storage unit, and updated when said towing vehicle moves to a new position. These steps make up another exemplary way of determining when said first wagon has passed said first path portion.

Said part of said first towing vehicle and said part of a wagon being pulled by said first towing vehicle between which said distance can be determined may for example be a wheel axle, the front of said vehicle/wagon or the back of said vehicle/wagon. Different parts may be used for the first towing vehicle and the wagons, for example said distance may be measured between a wheel axle of said first towing vehicle and the back of each of the wagons being pulled by said first towing vehicle. Alternatively, the same corresponding parts may be used, for example the distance may be measured between the back of said first towing vehicle and the back of each of the wagons.

According to one exemplary embodiment of the method, wherein, if said first wagon is disconnected from said first towing vehicle, the reserved state assigned to the path portion covered by said first wagon is cancelled once said first wagon has been removed from said path portion. This embodiment has the advantage that any wagon that is disconnected and left on said first path will still occupy a path portion assigned with a reserved state, until said wagon is moved, so that collisions between said wagon and any other AGV or wagon are avoided.

Disconnecting said first wagon from said first towing vehicle may be done when said first wagon is the only wagon pulled by said first towing vehicle, or when said first wagon is connected to said first towing vehicle via other wagons also pulled by said first towing vehicle.

According to another exemplary embodiment, said first path includes a curved path portion, wherein said first path portion covers at least a part of said curved path portion. According to another embodiment, said first path has a curved extension between said first and second position. According to one embodiment, said first path includes more than one curved path portion.

According to another exemplary embodiment, wherein said first path portion covers at least a part of a curved path portion, the width of said first path portion corresponds to the largest of the width of the first towing vehicle and the width of the first wagon or any other wagon being pulled by said first towing vehicle, plus an extra safety margin.

According to one exemplary embodiment, the stored data identifying the position of said first wagon when said position is in said curved path portion corresponds to the stored data identifying a previous position of the first towing vehicle when said first towing vehicle was in said curved path portion.

In one exemplary embodiment, said method can be reiterated. In another embodiment, some of the steps of said method can be reiterated.

According to another exemplary embodiment, said method further comprises determining said second position of said first towing vehicle, and storing data identifying said second position in said data storage unit. The step of determining the second position may be performed before or after said first towing vehicle moves to said second position. Based on the stored data identifying said second position and said determined first path, a reserved state may then be assigned to a second path portion. This may also be done before or after the first towing vehicle moves to said second position. The method according to this embodiment further comprises prohibiting said second automated guided vehicle from entering said second path portion while in the reserved state, to prevent the second automated guided vehicle from colliding with said first wagon or said first towing vehicle. Said first towing vehicle is moved from said second position, along said first path, to a third position, and said reserved state of said second path portion is cancelled once said first wagon has passed said second path portion.

According to another exemplary embodiment, said method further comprises determining a second path for said first towing vehicle and/or said second automated guided vehicle to travel along. Assigning a reserved state to said first path portion of said first path may in this embodiment include assigning a reserved state to a first path portion of said second path. This can happen when said first and second paths intersect.

According to one exemplary embodiment, if at least one additional wagon has been connected distally to the first wagon after the reserved state of said first or any subsequent path portion has been cancelled due to the first wagon passing said path portion, said method further comprises reassigning a reserved state to said first or subsequent path portion and prohibiting said second automated guided vehicle from entering said first or subsequent path portion while in the reserved state. Cancelling of said reserved state of said first or subsequent path portion occurs once said additional wagon has passed said first or subsequent path portion.

In one exemplary embodiment of the first aspect of the present invention, the first path may be divided into predetermined path portions. These may be defined using segments and dots, only segments or a grid, for example. The length and shape of the predetermined path portions may vary, or they may all have the same length and shape, or the same length, or the same shape. In one exemplary embodiment, said first path portion overlaps with one of said predetermined path portions. In another exemplary embodiment, said first path portion covers more than one of said predetermined path portions. In another exemplary embodiment, said first path portion only partially overlaps with one of said predetermined path portions.

In one exemplary embodiment, the second automated guided vehicle is in the form of a second towing vehicle, and reservations of path portions may also be made based on the positions of said second towing vehicle. In another exemplary embodiment, said second towing vehicle is pulling at least one wagon.

In one exemplary embodiment, the first time the method is performed, a reserved state may be manually assigned to the portions of the first path that are occupied by said first wagon or any other wagon being pulled by said first towing vehicle. Assigning reserved states manually may be performed by an operator entering data into the data storage unit regarding the positions of the wagons. Path portions including these positions may then be reserved. These reserved states are cancelled when said first wagon has passed said respective path portion.

In one exemplary embodiment, when said reserved state is assigned to said first path portion, said first path portion extends from the back of said towing vehicle to the front of said first towing vehicle. In another exemplary embodiment, when said reserved state is assigned to said first path portion, said first path portion may extend from the back of said first towing vehicle to a point ahead of the front of said first towing vehicle. In another exemplary embodiment, when said reserved state is assigned to said first path portion, said first path portion may extend from the front of said first towing vehicle, or a point ahead of said front, to a point further ahead of said front. In one exemplary embodiment, the extension of said first path portion may vary between the reiterations of the method.

In one exemplary embodiment, data identifying said first position is only stored in said data storage unit until said reserved state of said first path portion is cancelled. In another exemplary embodiment, data is only stored for a predetermined time after said reserved state of said first path portion is cancelled. In another exemplary embodiment, there is no restriction to how long data is stored in said data storage unit.

According to a second aspect of the present invention, an automated guided vehicle system is provided. Said system comprises at least a first and a second automated guided vehicle, wherein at least said first automated guided vehicle is in the form of a first towing vehicle, and wherein said first towing vehicle is adapted to move from a first position to a second position along at least a first path. Said system further comprises at least a first wagon adapted to be pulled by said first towing vehicle, a position determining means for determining said first position of said first towing vehicle, and a data storage unit for storing data identifying said first position of said first towing vehicle. The system also comprises a control unit adapted for determining at least said first path for said first towing vehicle to travel along, and based on said stored data, assigning a reserved state to at least a first path portion of said first path. Said control unit is further adapted for prohibiting said second automated guided vehicle from entering said first path portion while in the reserved state, to prevent the second automated guided vehicle from colliding with said first wagon or said first towing vehicle, and for cancelling said reserved state of said first path portion once said first wagon has passed said first path portion.

In one exemplary embodiment of the second aspect of the present invention, said data storage unit is a part of said control unit. The control unit may for example be a computer comprising a data storage unit in the form of a hard disk or in the form of an internal memory. In another exemplary embodiment, said data storage unit and said control unit are separate units. In one exemplary embodiment of said system, said control unit is located centrally. In another exemplary embodiment, said control unit is located in one of said automated guided vehicles.

Said position determining means may be in the form of reflectors arranged on walls, used in combination with laser scanners arranged on each one of said first towing vehicle and said second automated guided vehicle. In another exemplary embodiment, said position determining means may be in the form of laser scanners arranged on each one of said first towing vehicle and said second automated guided vehicle, wherein said laser scanners use the environment, such as walls, to navigate. Alternatively, said position determining means may be using magnets in the floor for determining where said vehicles are located.

Said position determining means may be located centrally or in each one of said automated guided vehicles, or it may be located both centrally and in each one of said automated guided vehicles.

In another exemplary embodiment of the second aspect, said system further comprises communication means. Said communication means may enable communication between said control unit and said automated guided vehicles, and/or said control unit and said position determining means, and/or said control unit and said data storage means. Said communication means may for example be a WLAN system.

According to one exemplary embodiment of the first aspect of the present invention, said method is performed using a system according to any one of the exemplary embodiments of the second aspect of the present invention.

BRIEF DESCRIPTION OF THE DRAWINGS

These and other aspects of the present invention will now be described in more detail, with reference to the appended drawings showing at least four different embodiments of the invention.

DETAILED DESCRIPTION OF EMBODIMENTS

Figure 1:
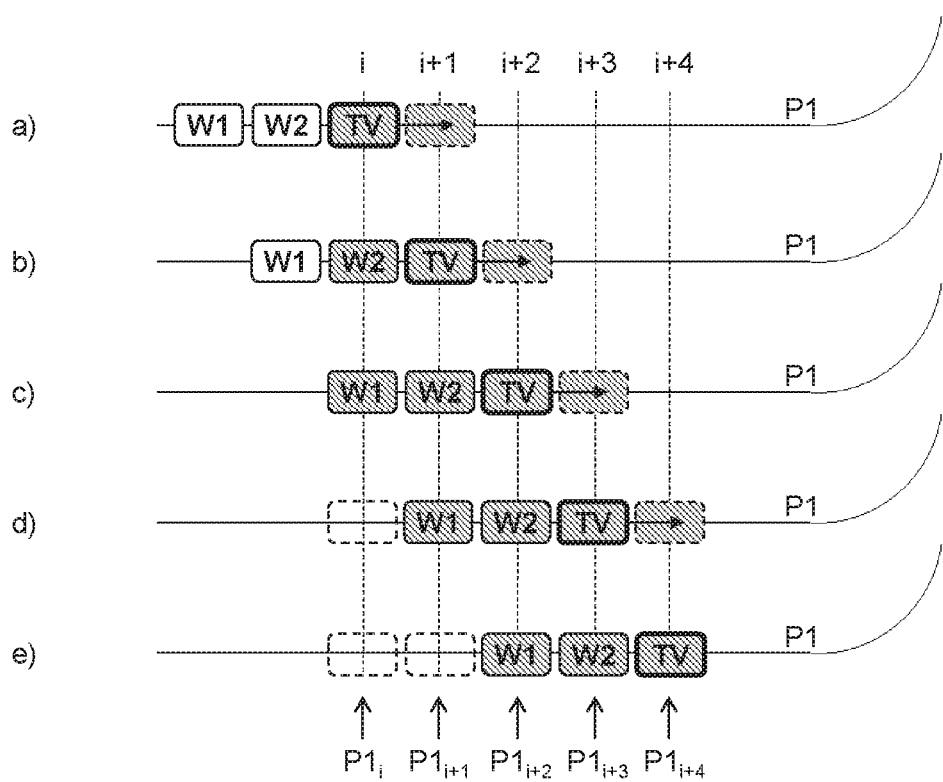
FIG. 1 is a schematic illustration of at least a first exemplary embodiment of the present invention.

FIG. 1 illustrates a method according to at least a first exemplary embodiment of the present invention. According to this embodiment, the method is performed in a system comprising a first automated guided vehicle in the form of a first towing vehicle TV, pulling a second wagon W2 and a first wagon W1. The system further comprises a second automated guided vehicle, not shown in this figure. A software on a central computer is used to determine a set of paths for said towing vehicles and wagons to travel along.

In FIG. 1, a first path P1 is illustrated. Areas defined by a solid line are path portions occupied by an automated guided vehicle or a wagon. Areas defined by a solid line and covered with a diagonal pattern are path portions occupied by an automated guided vehicle or a wagon that are assigned with a reserved state. Areas defined by a dashed line but not covered by a diagonal pattern are path portions that have previously been assigned a reserved state, which has now been cancelled. Areas defined by a dashed line and covered with a diagonal pattern are path portions assigned with a reserved state but not occupied by a wagon or automated guided vehicle. Five different stages are shown, a)-e).

Stage a) of FIG. 1 illustrates a first iteration of the method. The system determines a first position i of the first towing vehicle, and stores data identifying said first position i in a data storage unit. In this embodiment, the data storage unit is centrally located, but it may also or instead be located in each of the automated guided vehicles respectively. Based on said stored data and said determined first path P1, a reserved state is assigned to a first path portion $P1_i$ of said first path P1, i.e. the portion occupied by the first towing vehicle TV. The width of said first path portion $P1_i$ may suitably correspond to the largest of the width of the first towing vehicle and the width of the first wagon or any other wagon being pulled by said first towing vehicle, plus an additional safety margin.

While in the reserved state, the second automated guided vehicle (not shown) is prohibited from entering said first path portion $P1_i$, to prevent the second automated guided vehicle from colliding with said first towing vehicle TV.

A second position i+1 to which the first towing vehicle TV is to be moved is determined by the system, and based on said stored data, said determined first path P1 and said determined second position i+1, a reserved state may suitably be assigned to a second path portion $P1_{i+1}$ of said first path P1, i.e. ahead of said first towing vehicle TV in the direction of movement, covering said second position i+1. Once said reserved state has been assigned, said first towing vehicle TV moves to said second position i+1. Said reserved state of said first path portion $P1_i$ is not cancelled until said first wagon W1 has passed said first path portion $P1_i$, i.e. stage d).

Stage b) of FIG. 1 illustrates the system when said first towing vehicle TV has moved to said second position i+1. Here the first $P1_i$ and second $P1_{i+1}$ path portions are still in a reserved state, since the first wagon W1 has not passed said first or second path portion.

Data identifying said second position i+1 of said first towing vehicle is stored in said data storage unit, and a third position i+2 of said first towing vehicle TV may suitably be determined. A reserved state may be assigned to a third path portion $P1_{i+2}$ of said first path P1, ahead of said first towing vehicle TV in the direction of movement, covering said third position i+2. Said first towing vehicle TV can then move to said third position i+2.

Stage c) of FIG. 1 illustrates another iteration of said method, in which a reserved state is assigned to a fourth path portion $P1_{i+3}$ of said first path. Said first towing vehicle then moves to a fourth position i+3.

Once said first towing vehicle moves to said fourth position i+3, said first wagon W1 passes said first path portion $P1_i$ of said first path P1, and said reserved state of said first path portion $P1_i$ is then cancelled. This is illustrated in stage d), which also shows the final iteration of said method illustrated in this figure, in which a reserved state is assigned to a fifth path portion $P1_{i+4}$ of said first path P1.

In stage e), the first towing vehicle TV has reached its fifth position i+4, and no further movement has been planned in this example. The reserved state of the second path portion $P1_{i+1}$ is cancelled due to the first wagon W1 passing said second path portion $P1_{i+1}$. The third $P1_{i+2}$, fourth $P1_{i+3}$ and fifth $P1_{i+4}$ path portions remain in a reserved state until the first towing vehicle TV moves further so that said first wagon W1 passes said path portions.

The distance between said positions of said first towing vehicle TV, as well as the length of the reserved path portions, do not have to be equal to the length of the wagons W1, W2 being pulled by said first towing vehicle TV, or to the length of said first towing vehicle TV. Neither do the distance between said positions and the length of said reserved path portions have to be the same for each of the iterations of the method.

FIG. 2a-FIG. 2f also illustrate the first exemplary embodiment of the present invention. In these illustrations, the method is reiterated further. Said first path P1, comprising a curved path portion, and a second path P2 are illustrated, together with said first towing vehicle TV pulling a second wagon W2 and a first wagon W1, and a second towing vehicle TV' pulling a second wagon W2' and a first wagon W1'. Said first P1 and second P2 paths intersect. As in FIG. 1, areas defined by a solid line are path portions occupied by an automated guided vehicle or a wagon. Areas defined by a solid line and covered with a diagonal pattern are path portions occupied by an automated guided vehicle or a wagon that are assigned with a reserved state. Areas defined by a dashed line but not covered by a diagonal pattern are path portions that have previously been assigned a reserved state, which has now been cancelled. Areas defined by a dashed line and covered with a diagonal pattern are path portions assigned with a reserved state but not occupied by a wagon or automated guided vehicle.

Figure 2A:
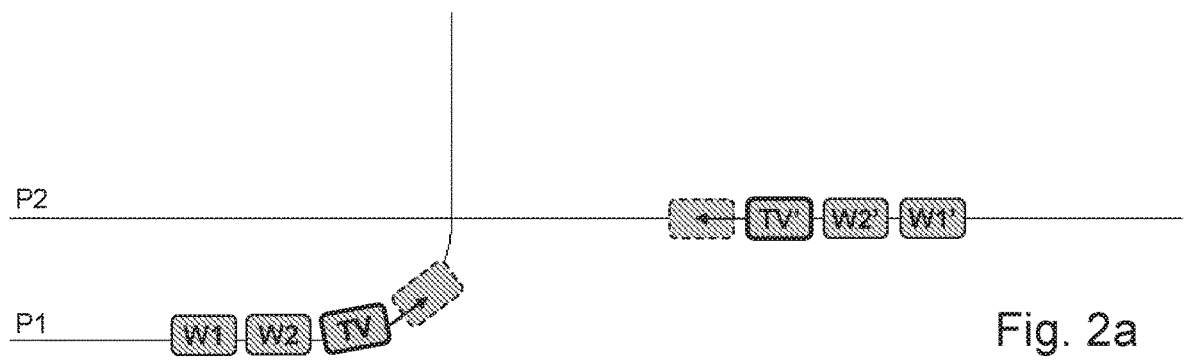
FIG. 2a-FIG. 2f are schematic illustrations of six different stages of iterations of said first exemplary embodiment.
Figure 2B:
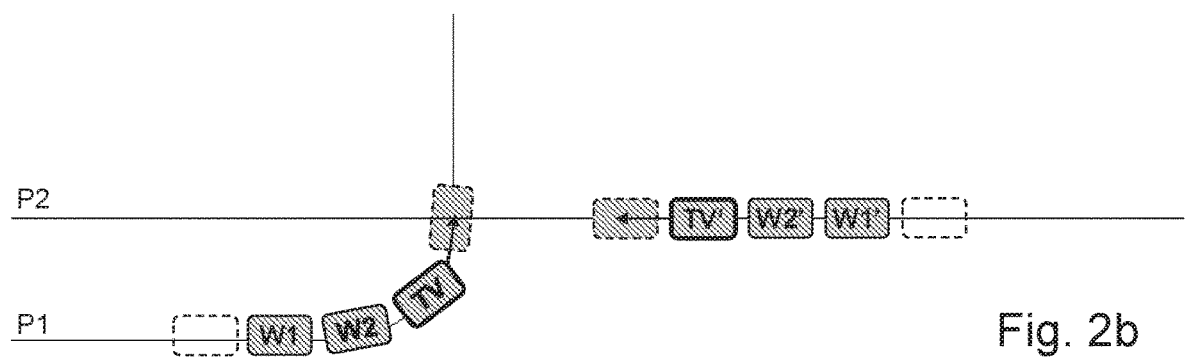
Figure 2C:
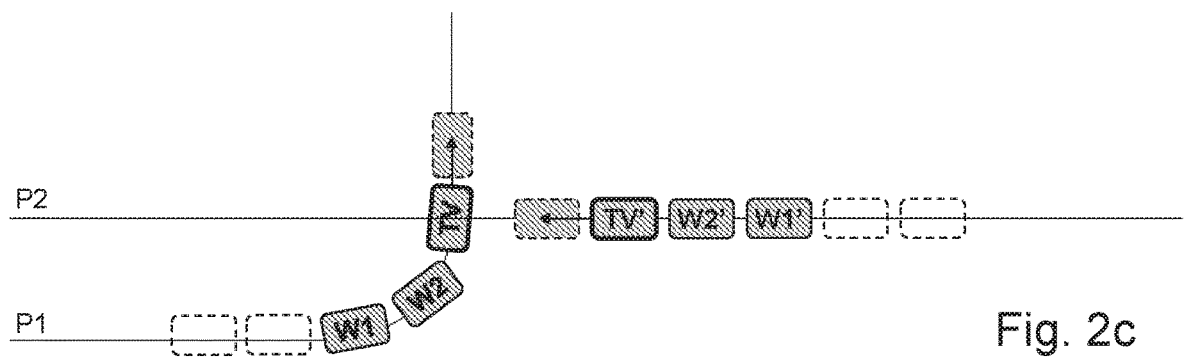
Figure 2D:
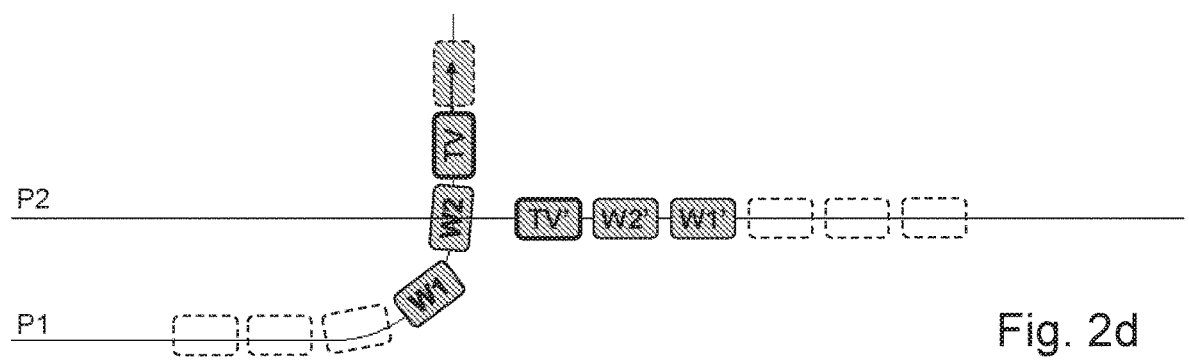
Figure 2E:
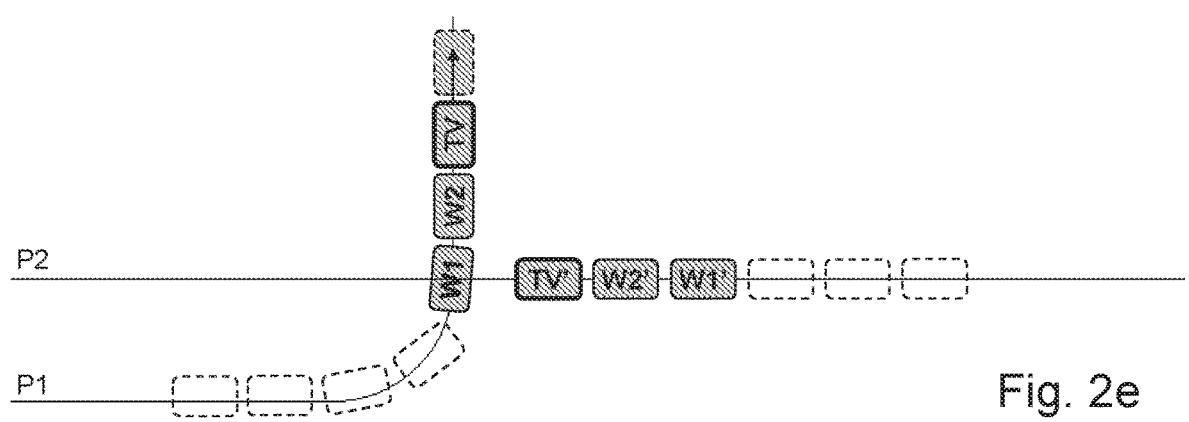
Figure 2F:
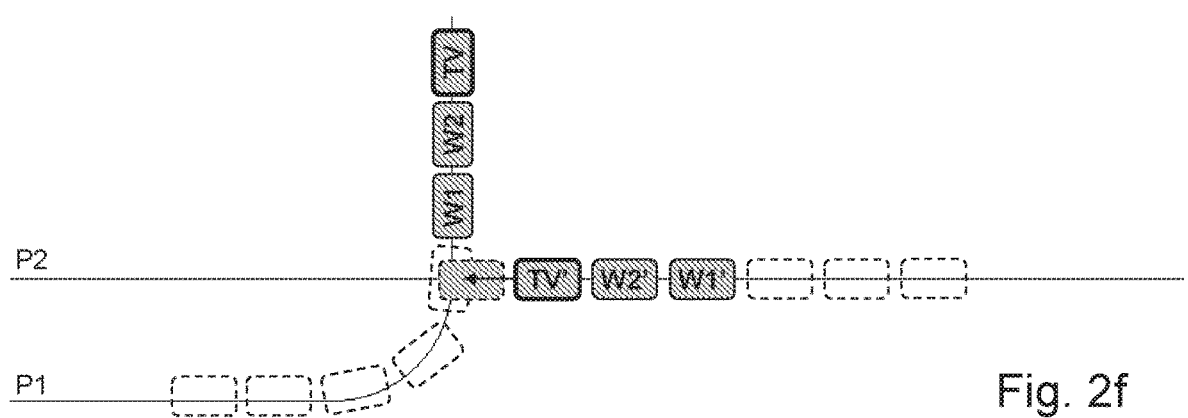

FIG. 2a-FIG. 2f show six different stages, between which both of the first and second towing vehicle move from their first respective positions in FIG. 2a to their second respective positions in FIG. 2b, from said respective second positions in FIG. 2b to their third respective positions in FIG. 2c, from said respective third positions in FIG. 2c to their fourth respective positions in FIG. 2d, from said respective fourth positions in FIG. 2d to their fifth respective positions in FIG. 2e, and from said respective fifth positions in FIG. 2e to their sixth respective positions in FIG. 2f. Between each of the first to fourth positions, said first path has a curved extension in this exemplary embodiment. In all of the stages 2a-2f, path portions are assigned with reserved states and reserved states are cancelled in the same manner as described in relation to FIG. 1.

In FIG. 2b it is illustrated how the current second position of the first towing vehicle TV and its planned third position causes a reserved state to be assigned to both a path portion of said first path P1 and a path portion of said second path P2. This reservation is not cancelled until said first wagon W1 has passed said path portion, which results in that the second towing vehicle TV' is prohibited from travelling along said second path P2 across said first path P1 until said reserved state of said path portion has been cancelled. This is illustrated in FIG. 2d, where the second towing vehicle TV' has reached a position from which it is prohibited from moving further until said reserved state covering a path portion of said second path P2 has been cancelled. This prohibition prevents said second towing vehicle TV' from colliding with any one of said first towing vehicle TV, said first wagon W1 being pulled by said first towing vehicle TV, or said second wagon W2 being pulled by said first towing vehicle TV.

In FIG. 2f, the first wagon W1 being pulled by said first towing vehicle TV has passed the reserved path portion that was blocking the second towing vehicle TV' from being allowed to move further along said second path P2. The reserved state of said path portion is therefore cancelled, and the second towing vehicle TV' is then allowed to reserve a path portion partially overlapping said previously reserved path portion, so that it can cross said first path P1 without risking collision.

In order for the system in at least this first exemplary embodiment to know when said first wagon W1 has passed a certain path portion, so that the reserved state should be cancelled, the length of the first towing vehicle TV together with said first wagon W1 and any other wagon being pulled by said first towing vehicle TV should be known (i.e. the length of the train should be known). In the first exemplary embodiment this means the length of the first towing vehicle TV together with the first wagon W1 and the second wagon W2. This length together with the stored data identifying the current and previous positions of the first towing vehicle TV are used to determine where the first wagon W1 is located, and whether or not it has passed a certain path portion. Alternatively, it may suffice to have information about the length of that part of the train which is pulled by the first towing vehicle TV, i.e. the length of the wagons W1, W2 and any coupling parts which connect the wagons W1, W2 to each other and to the first towing vehicle TV. For instance, in the example shown in FIG. 1, when the first towing vehicle TV has travelled from position i in stage a) to position i+3 in stage d) it has travelled a length which corresponds to the length of the train. Since the system knows the position i+3 of the first towing vehicle TV as well as its historical position i, and in addition knows the length of the train, the system will now know that at this stage d) the first wagon W1 has passed the path portion $P1_i$ at position i, even though the first wagon W1 (unlike the towing vehicle TV) does not communicate with the components of the system. N.B. if the towing vehicle would have been longer, for instance covering two path portions $P1_i$ and $P1_{i+1}$ (while the length of the wagons would have been the same as in FIG. 1), the distance that the longer towing vehicle would need to travel before the reservation of path portion $P1_i$ is cancelled would be the same as in the above example. Put differently, the cancellation of a reserved path portion may be based on the length of travel of a rear portion of a towing vehicle.

Thus, generally speaking, in at least some exemplary embodiments, a distance from a certain point of the first towing vehicle to the rear portion of the first wagon is determined (may be directly or indirectly determined), wherein when the first towing vehicle has moved said distance from its first position, the reserved state of the first path portion may be cancelled (since the system now knows that the first wagon has passed the first path portion). Said certain point of the vehicle may suitably be at the front part of the vehicle or at a wheel axle, etc.

In other general terms, in at least some exemplary embodiments, a current position of the first wagon is determined based on a current position of the first towing vehicle and also based on the distance between a part of the first towing vehicle and a part, such as a rear part, of the first wagon. Said distance should be measured along the path that said first towing vehicle and said first wagon are traveling along.

FIG. 2b shows a path portion along said first path P1 which has previously been assigned a reserved state that has now been cancelled due to the first wagon W1 passing said path portion. If an additional wagon were to be connected distally to said first wagon W1 at this stage, a reserved state would suitably be reassigned to said path portion, and said second towing vehicle TV' would be prohibited from entering said path portion while in the reserved state. The reserved state of said path portion would suitably be cancelled once said additional wagon has passed said path portion.

Figure 3A:
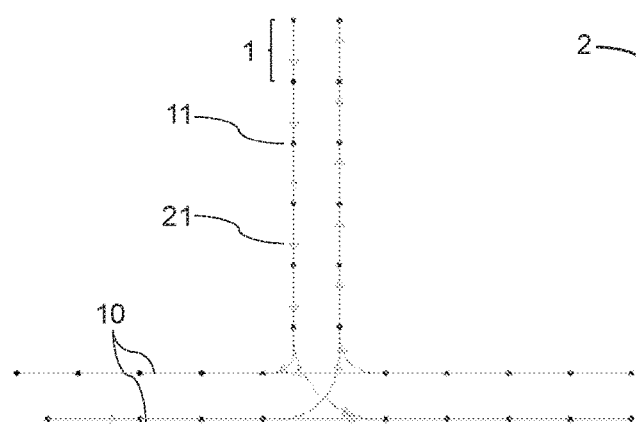
FIG. 3a shows an illustration of paths divided into predetermined path portions according to at least a second exemplary embodiment of the present invention.

FIG. 3a illustrates a plurality of paths 10 according to at least a second exemplary embodiment of the present inventive concept. According to this embodiment, a plurality of paths 10 are determined and divided into predetermined path portions in the form of segments 1 connected by start/end points 11. Assigning a reserved state to a path portion in this embodiment can therefore mean assigning a reserved state to a segment 1, a start/end point 11, or a combination of segments 1 and start/end points 11. When more than one segment 1 and start/end points 11 are reserved, they can be part of different paths. The arrows 21 illustrated on some of the segments in the figure indicate the direction of movement allowed on each segment respectively.

Figure 3B:
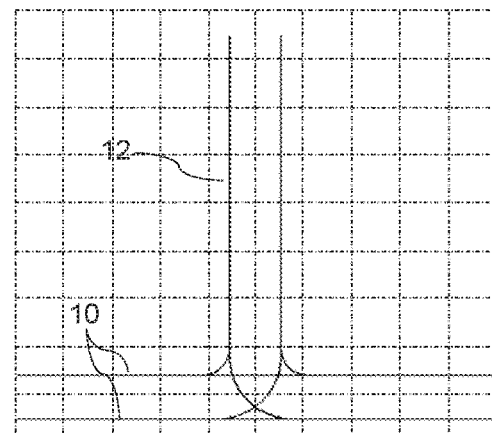
FIG. 3b shows an illustration of paths divided into predetermined path portions according to at least a third exemplary embodiment of the present invention.

FIG. 3b also illustrates a plurality of paths 10, according to at least a third exemplary embodiment. According to this embodiment, similarly to the second embodiment, a plurality of paths 10 are determined and divided into predetermined path portions. In this third embodiment, instead of segments and start/end points, a grid system 2 is used to divide the paths 10 into portions. Assigning a reserved state to a path portion in this embodiment can therefore mean assigning a reserved state to a part of a path covered by one of the squares 12 in the grid. It may also include assigning a reserved state to parts of several paths covered by one of the squares 12, or it may include parts covered by several squares.

Figure 4:
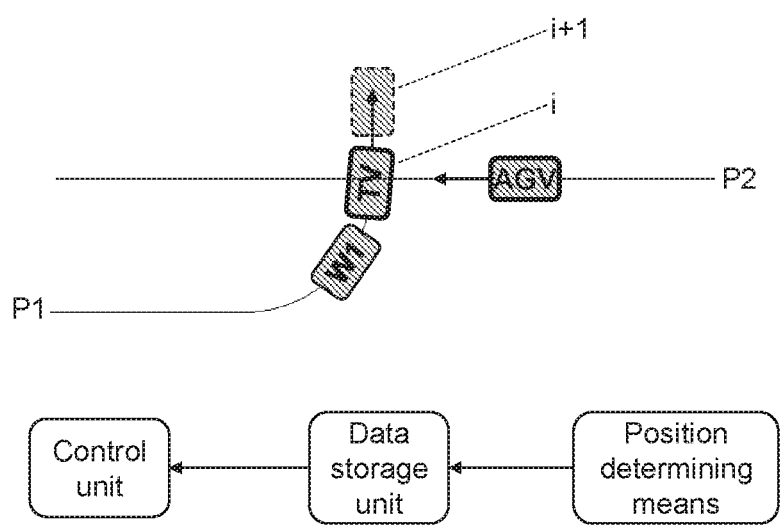
FIG. 4 is a schematic illustration of a system according to at least a fourth exemplary embodiment of the present invention.

FIG. 4 shows a schematic illustration of a system according to at least a fourth exemplary embodiment of the present invention. The system comprises a first automated guided vehicle TV and a second automated guided vehicle AGV, wherein said first automated guided vehicle TV is in the form of a first towing vehicle. Said first towing vehicle TV is pulling a first wagon W1, and is in this exemplary embodiment moving from a first position i to a second position i+1 along a first path P1. The system may further comprise a second path P2 for said second automated guided vehicle AGV to move along.

The system further comprises a position determining means, which determines said first position i of said first towing vehicle TV, and suitably also a first position of said second automated guided vehicle AGV. The system also comprises a data storage unit where data identifying said first position i of said first towing vehicle TV can be stored. The embodied system further comprises a control unit, for determining said first path P1, and suitably said second path P2. Said control unit may, based on said stored data, assign a reserved state to a path portion of said first path P1, and it may cancel said reserved state once said first wagon W1 has passed said path portion. Said control unit can also prohibit said second automated guided vehicle AGV from entering said path portion while in the reserved state, to prevent the second automated guided vehicle AGV from colliding with said first wagon W1 or said first towing vehicle TV.

The person skilled in the art realizes that the present invention by no means is limited to the embodiments described above. On the contrary, many modifications and variations are possible within the scope of the appended claims. For example, more than two automated guided vehicles may be included in the system in which the method is performed. All of the automated guided vehicles in a system may be towing vehicles pulling wagons, or only some of the vehicles may be towing vehicles pulling wagons. Further, the width of the path portions that are assigned with a reserved state may vary, or all portions may have the same width.

The invention claimed is:

1. A method for controlling the travel path of automated guided vehicles in a system comprising at least a first and a second automated guided vehicle, wherein at least said first automated guided vehicle is in a form of a first towing vehicle, and wherein at least said first towing vehicle is pulling at least a first wagon, said method comprising:
    determining at least a first path for said first towing vehicle to travel along,
    determining a first position of the first towing vehicle and storing data identifying said first position in a data storage unit,
    based on said stored data and said determined first path, assigning a reserved state to at least a first path portion of said first path,
    prohibiting said second automated guided vehicle from entering said first path portion while in the reserved state, to prevent the second automated guided vehicle from colliding with said first wagon or said first towing vehicle,
    moving said first towing vehicle from said first position, along said first path, to a second position, and
    cancelling said reserved state of said first path portion once said first wagon has passed said first path portion,
    wherein said method further comprises:
    determining a total length along said first path of the first wagon and any other wagon being pulled by said first towing vehicle,
    determining a position of said first wagon based on the stored data identifying positions of the first towing vehicle and said total length along said first path,
    storing data identifying the position of said first wagon, and
    updating said data identifying the position of said first wagon when said towing vehicle moves to a new position.

2. A method according to claim 1, wherein said step of assigning a reserved state to said first path portion is performed when at least a part of said first wagon has not yet reached said first path portion.

3. A method according to claim 1, wherein said first towing vehicle is pulling multiple wagons, and said first wagon is the wagon out of the multiple wagons which is currently located most distally from said first towing vehicle.

4. A method according to claim 1, wherein the width of said first path portion corresponds to the largest of the width of the first towing vehicle and the width of the first wagon or any other wagon being pulled by said first towing vehicle, plus an additional safety margin, wherein said safety margin is 50-1000 mm.

5. A method according to claim 1, wherein said method further comprises:
    determining a distance along said first path respectively between a part of said first towing vehicle and a part of each wagon being pulled by said towing vehicle,
    determining a respective position of each of said wagons based on said stored data identifying positions of said first towing vehicle and said respective distance along said first path,
    storing data identifying said respective position of each of said wagons in said data storage unit, and
    updating said data identifying said respective position of each of said wagons when said towing vehicle moves to a new position.

6. A method according to claim 5, wherein, if said first wagon is disconnected from said first towing vehicle, the reserved state assigned to the path portion covered by said first wagon is cancelled once said first wagon has been removed from said path portion.

7. A method according to claim 1, wherein a distance from a certain point of the first towing vehicle to a rear portion of the first wagon is determined directly or indirectly, wherein when the first towing vehicle has moved said distance from its first position, the reserved state of the first path portion may be cancelled.

8. A method according to claim 1, wherein a current position of the first wagon is determined based on a current position of the first towing vehicle and also based on the distance between a part of the first towing vehicle and a part of the first wagon.

9. A method according to claim 1, wherein said first path includes a curved path portion, wherein said first path portion covers at least a part of said curved path portion.

10. A method according to claim 1, wherein said first path has a curved extension between said first and second position.

11. A method according to claim 1, wherein said method further comprises:
    determining said second position of said first towing vehicle, and storing data identifying said second position in said data storage unit,
    based on said stored data identifying said second position and said determined first path, assigning a reserved state to a second path portion of said first path,
    prohibiting said second automated guided vehicle from entering said second path portion while in the reserved state, to prevent the second automated guided vehicle from colliding with said first wagon or said first towing vehicle,
    moving said first towing vehicle from said second position, along said first path, to a third position, and cancelling said reserved state of said second path portion once said first wagon has passed said second path portion.

12. A method according to claim 1, wherein said method further comprises:
   determining a second path for said first towing vehicle and/or said second automated guided vehicle to travel along,
   wherein assigning a reserved state to said first path portion of said first path optionally includes assigning a reserved state to a first path portion of said second path.

13. A method according to claim 1, wherein, if at least one additional wagon has been connected distally to the first wagon after the reserved state of said first or any subsequent path portion has been cancelled due to the first wagon passing said path portion, said method further comprises:
   reassigning a reserved state to said first or subsequent path portion,
   prohibiting said second automated guided vehicle from entering said first or subsequent path portion while in the reserved state, and
   cancelling said reserved state of said first or subsequent path portion once said additional wagon has passed said first or subsequent path portion.

14. An automated guided vehicle system comprising:
   at least a first and a second automated guided vehicle, wherein at least said first automated guided vehicle is in the form of a first towing vehicle, and wherein said first towing vehicle is adapted to move from a first position to a second position along at least a first path,
   at least a first wagon adapted to be pulled by said first towing vehicle,
   a position determining means for determining said first position of said first towing vehicle,
   a data storage unit for storing data identifying said first position of said first towing vehicle, and
   a control unit for
      determining at least said first path for said first towing vehicle to travel along, based on said stored data,
      assigning a reserved state to at least a first path portion of said first path,
      prohibiting said second automated guided vehicle from entering said first path portion while in the reserved state, to prevent the second automated guided vehicle from colliding with said first wagon or said first towing vehicle,
      cancelling said reserved state of said first path portion once said first wagon has passed said first path portion, and
      determining a position of said first wagon based on the stored data identifying positions of the first towing vehicle and a total length along said first path of the first wagon and any other wagon being pulled by said first towing vehicle, storing data identifying the position of said first wagon, and updating said data identifying the position of said first wagon when said towing vehicle moves to a new position.

15. A method for controlling the travel path of automated guided vehicles in a system comprising at least a first and a second automated guided vehicle, wherein at least said first automated guided vehicle is in the form of a first towing vehicle, and wherein at least said first towing vehicle is pulling at least a first wagon, said method comprising:
   determining at least a first path for said first towing vehicle to travel along,
   determining a first position of the first towing vehicle and storing data identifying said first position in a data storage unit,
   based on said stored data and said determined first path, assigning a reserved state to at least a first path portion of said first path,
   prohibiting said second automated guided vehicle from entering said first path portion while in the reserved state, to prevent the second automated guided vehicle from colliding with said first wagon or said first towing vehicle,
   moving said first towing vehicle from said first position, along said first path, to a second position, and
   cancelling said reserved state of said first path portion once said first wagon has passed said first path portion,
   wherein the width of said first path portion corresponds to the largest of the width of the first towing vehicle and the width of the first wagon or any other wagon being pulled by said first towing vehicle, plus an additional safety margin, wherein said safety margin is 50-1000 mm.

16. A method for controlling the travel path of automated guided vehicles in a system comprising at least a first and a second automated guided vehicle, wherein at least said first automated guided vehicle is in the form of a first towing vehicle, and wherein at least said first towing vehicle is pulling at least a first wagon, said method comprising:
   determining at least a first path for said first towing vehicle to travel along,
   determining a first position of the first towing vehicle and storing data identifying said first position in a data storage unit,
   based on said stored data and said determined first path, assigning a reserved state to at least a first path portion of said first path,
   prohibiting said second automated guided vehicle from entering said first path portion while in the reserved state, to prevent the second automated guided vehicle from colliding with said first wagon or said first towing vehicle,
   moving said first towing vehicle from said first position, along said first path, to a second position, and
   cancelling said reserved state of said first path portion once said first wagon has passed said first path portion,
   wherein a distance from a certain point of the first towing vehicle to a rear portion of the first wagon is determined directly or indirectly, wherein when the first towing vehicle has moved said distance from its first position, the reserved state of the first path portion may be cancelled.

17. A method for controlling the travel path of automated guided vehicles in a system comprising at least a first and a second automated guided vehicle, wherein at least said first automated guided vehicle is in the form of a first towing vehicle, and wherein at least said first towing vehicle is pulling at least a first wagon, said method comprising
   determining at least a first path for said first towing vehicle to travel along,
   determining a first position of the first towing vehicle and storing data identifying said first position in a data storage unit,
   based on said stored data and said determined first path, assigning a reserved state to at least a first path portion of said first path,
   prohibiting said second automated guided vehicle from entering said first path portion while in the reserved state, to prevent the second automated guided vehicle from colliding with said first wagon or said first towing vehicle, moving said first towing vehicle from said first position, along said first path, to a second position, and cancelling said reserved state of said first path portion once said first wagon has passed said first path portion, wherein, if at least one additional wagon has been connected distally to the first wagon after the reserved state of said first or any subsequent path portion has been cancelled due to the first wagon passing said path portion, said method further comprises:

reassigning a reserved state to said first or subsequent path portion, prohibiting said second automated guided vehicle from entering said first or subsequent path portion while in the reserved state, and cancelling said reserved state of said first or subsequent path portion once said additional wagon has passed said first or subsequent path portion.

* * * * *